(12) United States Patent
Guerinon

(10) Patent No.: US 7,240,709 B2
(45) Date of Patent: Jul. 10, 2007

(54) EXTENDED-MOBILITY TIRE WITH DECOUPLED ANCHORING ZONE

(75) Inventor: Bernard Guerinon, Clermont-Ferrand (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 11/121,049

(22) Filed: May 4, 2005

(65) Prior Publication Data

US 2005/0247390 A1 Nov. 10, 2005

Related U.S. Application Data

(63) Continuation of application No. PCT/EP03/011993, filed on Oct. 29, 2003.

(30) Foreign Application Priority Data

Nov. 4, 2002 (FR) .................................. 02 13785

(51) Int. Cl.
*B60C 9/02* (2006.01)
*B60C 15/00* (2006.01)

(52) U.S. Cl. ............... 152/539; 152/544; 152/548; 152/550

(58) Field of Classification Search ............... 152/539, 152/544, 548, 550
See application file for complete search history.

(56) References Cited

U.S. PATENT DOCUMENTS 5,660,656 A * 8/1997 Herbelleauu et al. ....... 152/547
6,659,149 B2 * 12/2003 Pereira et al. ............... 152/544

FOREIGN PATENT DOCUMENTS

| WO | WO 99/64225 | 12/1999 |
|---|---|---|
| WO | WO 01/39999 | 6/2001 |
| WO | WO 01/40000 | * 6/2001 |
| WO | WO 02/051653 | 7/2002 |

* cited by examiner

*Primary Examiner*—Justin R. Fischer
(74) *Attorney, Agent, or Firm*—Buchanan Ingersoll & Rooney PC

(57) ABSTRACT

A tire for a vehicle wheel, comprising two sidewalls joined at their radially outer portions by a crown zone, beads, a reinforcement structure extending substantially radially from each of the beads, towards the crown zone, at least one of said beads comprising: a bead seat of inverted type; an anchoring zone for the reinforcement structure in said bead, comprising an arrangement of circumferential cords comprising at least two stacks distributed on either side of the reinforcement structure, said reinforcement structure being arranged so as to obtain a circumferential distribution of the cords on either side of at least one of said stacks. In this manner, a supplementary adjustment means is obtained which makes it possible to produce arrangements in which the aim is as far as possible towards equilibrium or uniformity of the stresses. Numerous benefits obtained in terms of durability and reliability.

9 Claims, 4 Drawing Sheets

EXTENDED-MOBILITY TIRE WITH DECOUPLED ANCHORING ZONE

The present application is a Continuation of International Application PCT/EP03/011993 filed on Oct. 29, 2003, and which published as WO2004/041557 on May 21, 2004.

BACKGROUND

The present invention relates to a tire for a vehicle wheel in which at least one of the beads comprises a seat having a generatrix, the axially inner end of which lies on a circle of diameter greater than the diameter of the circle on which the axially outer end is located. This type of design is particularly suited to the new generations of tires which can be used, within certain limits, under low-pressure, or even zero- or virtually zero-pressure conditions, and which have a lesser risk of separation of the tire from the rim on which it is mounted. This concept is frequently designated by the expression "extended mobility".

For a long time, tire manufacturers have been trying to develop a tire which does not create any source of risk or potential danger in the event of an abnormal drop in, or even total loss of, pressure. One of the difficulties encountered relates to travelling with a flat tire or at very low pressure, because, when travelling at very low pressure, or even at zero pressure, with conventional tires, the beads are at great risk of separating from the periphery of the rim against which they were held by the pressure.

Numerous solutions have been tested in order to overcome these disadvantages. Frequently, these solutions cause additional difficulties in mounting and demounting the tire on/from the rim.

Furthermore, the clamping function of the tire on the rim is an essential function for ensuring the qualities of the tire in operation, because it directly or indirectly affects many aspects such as mounting (sometimes referred to as "clipping") or fastening of the tire, the air-tightness of the tire, non-rotation on rim, etc. These functions are all important and require specific characteristics and rigorous manufacture of the products, in particular if high quality standards are desired. Now, the rims and tires frequently, for a given dimension, have slightly different actual dimensions, mainly due to the manufacturing tolerances. These variations in dimensions complicate compliance with the different functions listed above.

To fulfill these functions, two broad types of solution are used industrially. First of all, for traditional tires, the bead wire simultaneously performs all these functions.

More recently, for several types of products manufactured by the Applicant, the conventional bead wire has been replaced by an anchoring zone comprising in particular arrangements of circumferential cords cooperating with the carcass-type reinforcement structure via an anchoring or bonding mix. In this case too, the anchoring zone performs all the functions set forth above.

However, in both these cases, it is difficult to optimise certain parameters because, very often, an improvement in one parameter causes another to deteriorate. There are thus certain limits to making such compromises between a gain on one hand and a loss on another, since it is often difficult to tolerate poorer performance for certain aspects.

EP 0 582 196 discloses a tire comprising a tread extended by two sidewalls and two beads and also a carcass anchored in the two beads to an annular reinforcement. The carcass is formed of cords in an adjacent arrangement which are aligned circumferentially and are in contact with at least one layer of bonding rubber of very high elasticity modulus in the hooking zone of the bead comprising the annular reinforcement. In this tire, the annular reinforcement of the hooking zone of the bead is formed of stacks of circumferential cords with interposition of a layer of bonding rubber of very high elasticity modulus between the reinforcement cords of the carcass and these stacks. This embodiment is intended for tires of conventional type, with the beads being held against the rim hook due to the inflation pressure of the tire. In this type of arrangement, there is a predominance of forces in the lateral or axial direction, which induces major compressive forces which act substantially axially from the walls towards the centre of said bead. These forces increase according to the inflation pressure. The increase in pressure tends to make the bead slide against the hook, radially towards the outside. The stresses induced radially towards the inside, against the seat of the rim, decrease with the increase in pressure, or with any increase in the tension of the carcass-type reinforcement structure.

It will furthermore be noted that the stacks of cords are aligned in a direction substantially parallel to the orientation of the profile of the rim hook against which the bead bears. The profile of the bead of this type of tire is relatively narrow and elongated; the anchoring is distributed over the major part of the height and width of the bead. The passage of the carcass into the bead is generally substantially central relative to the walls of said bead. Furthermore, when it is a relatively narrow bead subject to predominantly axial forces, neither the inflation pressure nor the tension induced in the carcass permits generation of large moments or torques, which tend to make the bead pivot or turn on itself.

With such a type of tire, if the pressure drops and the vehicle continues to travel, holding of the tire on the rim is no longer ensured, and in the majority of cases it rolls off the rim.

EP 0 673 324 describes a rolling assembly comprising at least one tire with a radial carcass reinforcement which is anchored within each bead and a rim of specific shaping. This rim comprises a first seat with a generatrix such that the axially outer end of said generatrix is distant from the axis of rotation by a length less than the distance between its axially inner end, and is defined axially to the outside by a protrusion or rim flange. The tire comprises bead seats suitable for mounting on this rim. The type of tire/rim interface proposed in this document has many advantages compared with the solutions already known, in particular with regard to the ease of mounting/demounting, while making it possible to travel a certain distance despite a drop in pressure.

EP 0 748 287 describes a solution which permits initial optimisation of the basic technology described in EP 0 673 324 referred to above. This is a tire, at least one bead of which has a structure which makes it possible to modify the clamping of said bead according to the tension of the carcass reinforcement and in particular reinforcement thereof when the inflation pressure increases to its rated value. The document thus proposes using a bead with anchoring of the end of the carcass by turning it up about the base of the bead wire, via the axially and radially inner sides relative to the bead wire. The bead also comprises, adjacent to the bead wire and axially to the outside thereof, a profiled element of rubber mix of relatively high hardness against which the bead wire can exert a compressive force when the tension of the carcass reinforcement increases. This compressive force creates self-clamping of the toe of the bead on the mounting rim. The tension of the carcass therefore involves displacement of the bead wire towards the outside, so that the latter generates said compressive force. In such a configuration, the presence of a bead wire of conventional type and the turning-up of the carcass beneath the latter are presented as being indispensable for generating the compressive force. This restricts the other types of arrangement which can be considered Moreover, EP 0 922 592 describes two embodiments with the carcass anchored by turning it up axially towards the outside. The first embodiment proposes anchoring of the carcass in the bead by turning it up radially towards the outside of the end of the carcass. The upturn is surrounded on either side by two radially superposed layers of metal wires arranged axially side by side and covering substantially all the axial portion along the seat of the bead. The layers are arranged so as to be parallel to the seat. The types of wires and the corresponding dimensions are very precise. The second solution proposed in this document relates to bead seats with different diameters. The carcass is also secured differently from the first solution. First of all, the carcass is subdivided into two portions which are radially separated at the level of the bead. Each portion is adjoined by a layer of wires which is arranged radially, each layer being arranged radially to the outside against each of the carcass portions. The radially outer carcass portion and the layer of wires radially to the inside are separated by an insert of the elastomer of high hardness type provided in the bead. This insert axially lines the central portion of the bead and rises radially towards the outside and axially towards the inside, beyond the radial limit of the presence of the metal wires.

The two examples of solutions in EP 0 922 592 have several disadvantages. Thus, the securing of the carcass proposed in this document requires the presence of an upturn axially towards the outside of the end portion of the carcass. Furthermore, the superposed layers of wires are arranged radially close to the seat of the bead, for a good part at a radial position closer to the axis of rotation than the upper portion of the flange on which the bead bears. Unless highly extensible wires are used, it is difficult to mount/demount the tire, due to the unfavourable radial position of the wires. It will also be noted that the stacks are oriented substantially parallel to the profile of the seat against which the bead bears. According to the second solution, the carcass is subdivided into two portions and an insert of high hardness is necessary to separate on one hand the layers of wires and on the other hand the two carcass portions. However, the carcass is not anchored in the insert. The form of the insert described is limitative.

Document WO 01/39999 describes an extended-mobility tire, each of the beads of which comprises an inverted seat, an anchoring zone, a bearing zone and a transition zone. Each of the zones taken in isolation and also all the zones together to some extent form an internal bead capable of effecting relative movements, such as, for example, of the angular or rotational type, relative to another zone, or relative to a virtual centre of pressure CP, or relative to the seat of the rim, etc.

Preferably, said bearing zone is substantially elongated. It is extended, for example, substantially along the seat of the bead. The transfer of forces upon rotation of the bottom zone of the axially inner portion towards the axially outer portion is thus possible, while maintaining bearing pressure against at least one portion of the seat of the bead. The transfer of the forces creates self-clamping of the toe of the bead against the rim.

The present invention therefore proposes to overcome the various disadvantages inherent in the solutions set forth above. It proposes in particular a solution aimed at improving the dynamic stability of the anchoring zone.

To do this, it provides a tire for a vehicle wheel, comprising:

two sidewalls spaced apart axially from each other, joined at their radially outer portions by a crown zone provided on its radially outer portion with a circumferential tread;

beads, arranged radially to the inside of each of the sidewalls, each bead comprising a seat and an outer flange which are intended to come into contact with a suitable rim;

a reinforcement structure extending substantially radially from each of the beads, along the sidewalls, towards the crown zone;

at least one of said beads comprising:

a bead seat comprising a generatrix the axially inner end of which is located on a circle of diameter greater than the diameter of the circle on which the axially outer end is located;

an anchoring zone for the reinforcement structure in said bead, comprising an arrangement of circumferential cords arranged substantially adjacent to a portion of the reinforcement structure and comprising at least two stacks distributed on either side of the reinforcement structure, a bonding mix being arranged between the circumferential cords and the reinforcement structure, said anchoring zone being arranged in said bead in such a manner that, at normal pressure, the forces of the reinforcement structure are distributed substantially homogeneously on either side of said structure, in said anchoring zone, said reinforcement structure being arranged so as to obtain a circumferential distribution of the cords on either side of at least one of said stacks;

a bearing zone for said bead extending substantially along the seat of the latter;

said tire also comprising an external lateral zone arranged in the zone of the bead provided to be arranged between the rim hook and the anchoring zone, said zone being filled by a rubber mix of substantially high modulus.

Such a configuration makes it possible to achieve an optimum distribution of forces at the level of the anchoring zone, in particular in the arrangement of circumferential cords. Major differences in both the nature and the level of stresses to which the various cords in the arrangement are subjected are, for example, avoided, some cords for example being subjected to tensile loads, while others are subjected to compressive loads.

This more uniform distribution of the stresses is particularly advantageous for certain types of tires, in particular those having a very high sidewall, such as for vehicles of "SUV" type.

Furthermore, the specific arrangement of the cords of the carcass-type reinforcement structure so as to obtain more than one axial position of these cords in the anchoring zone contributes to distributing the forces at different locations. In the examples illustrated, there can be seen preferably two axially spaced positions in which the axially inner and axially outer portions of carcass-type reinforcement structure can be seen. In this manner, a supplementary adjustment means is obtained which makes it possible to produce arrangements in which the aim is as far as possible towards equilibrium or uniformity of the stresses. The benefits obtained in terms of durability and reliability may be considerable.

The cords of at least one stack of circumferential cords are consequently "surrounded", since some cords of the carcass-type reinforcement structure are axially to the outside relative to said stack, whereas others are axially to the inside relative to said stack, preferably alternating regularly along the circumference of the tire. This may be an alternation at each cord, at every two cords, three cords, or even more.

Advantageously, the external lateral zone is provided in the axially outer portion of the bead and extends between the portion adjacent to the rim hook and the anchoring zone. Advantageously, said zone cooperates with the anchoring zone, which permits a better mechanical action between said anchoring zone and the portion of the bead adjacent to the rim hook.

This zone makes it possible to increase the clamping pressure, in particular in the region of the rim hook. Thanks to the limited deformability of the zone, it makes it possible to limit the tendency of the bead to slip radially outwards beyond the rim hook. It furthermore contributes, on the one hand, to the inhibition of any tendency to generate a rotational moment and, on the other, to establish dynamic stability, such as for example when cornering or on exposure to major lateral stresses.

SUMMARY OF THE INVENTION

According to one advantageous embodiment, the tire comprises a single carcass-type reinforcement structure the cords of which are decoupled, that is to say arranged circumferentially alternating, axially internally and axially externally relative to said at least one stack. This is an embodiment which is particularly advantageous, economical and simple for tires of limited load.

According to another advantageous embodiment, the tire comprises two carcass-type reinforcement structures, the cords of the first of which are arranged axially internally and the cords of the second of which are arranged axially externally relative to said at least one stack. This embodiment lends itself particularly to tires capable of withstanding a heavier load. It is then all the more important to ensure that the distribution of the forces is optimal, because with higher loads, any imbalance in the distribution of the stresses may considerably affect the endurance and durability.

According to one or the other of the previous embodiments, several stacks of circumferential cords may advantageously be arranged between the axially inner and axially outer portions of the carcass-type reinforcement structure.

According to one advantageous variant embodiment of the tire according to the invention, between values corresponding substantially to zero pressure and a normal operating pressure, the distribution of pressure along the bearing zone is substantially independent of said pressure value.

Upon inflation of the tire, the effects generated on the distribution of forces along the interface between the bearing zone and the seat of the rim have no major impact on said distribution. A stability relative to the inflation dynamic is obtained which makes it possible better to guarantee good clamping on the rim, whatever the condition and independently of tolerances. Internal stresses, in particular at the level of the tire bead, are dynamically stable, so contributing to the product's extended service life. Said dynamic stability also makes it possible to avoid the occurrence of parasitic stresses at the level of the bead, such as, for example stresses likely to affect product properties or qualities. Furthermore, sensitivity to variations in tolerances in the rim/tire assembly is reduced.

Advantageously, said forces of the reinforcement structure cause a clamping pressure of the bead which is substantially symmetrical, or slightly asymmetrical on either side of the reinforcement structure.

Such a configuration makes it possible to aim at obtaining a clamping pressure which is substantially uniform along the seat of the bead. The properties/qualities set forth above are thus optimised still further. In the absence of major imbalances, excellent mounting stability and increased durability are obtained.

The anchoring zone is advantageously in the immediate proximity of the centre of inertia of the bead. This makes it possible to minimise the tendency of the bead to turn on itself; thus a major source of imbalances in the stresses is reduced. According to an advantageous example of embodiment, the centre of inertia is located in the anchoring zone, preferably in the immediate proximity of (or even merged with) the reinforcement structure.

The anchoring zone does not comprise a bead wire, in particular a bead wire of conventional type, such as, for example, a multi-cord bead wire against which a carcass ply is turned up, such that the zone of cooperation between the upturned portion of the ply and the bead wire effects the holding of the carcass ply.

The reinforcement structure of the sidewalls and the crown is advantageously of the carcass type, its mechanical properties being similar to those of carcass plies of known type.

The bearing zone is preferably intended to be in contact with the rim seat.

Preferably, the bearing zone is substantially formed of a rubber mix of high modulus. The presence of a zone of rubber of high modulus in a radially inner portion relative to the flange provides good axial holding and prevents the bead from sliding axially towards the outside.

According to a particularly advantageous method of manufacture in which the various constituents of the tire are arranged directly on a central core, the shape of which imparts to the tire during manufacture a substantially similar shape to the shape of the finished product, dispensing with the upturn (which exists in a conventional structure) permits advantageous simplification of manufacture.

According to an advantageous form of embodiment of the invention, the bases of the stacks (the cords radially closest to the axis of rotation of the tire) are arranged radially farther to the outside than the end of said flange (axially and radially outermost portion of said flange). The bases of the stacks are advantageously provided so as to be arranged radially externally relative to the flange of the rim which is matched to the tire. The mounting/demounting operations are then facilitated.

Advantageously, the carcass-type reinforcement structure extends substantially radially from each of the beads, along the sidewalls, towards the crown zone. Said structure may thus be unitary and extend from one bead to the other, or alternatively be divided into two half-structures, each extending along a single sidewall.

The number of stacks and the number of windings or turns of each of the stacks is advantageously established according to the characteristics desired for the tire, for example its operating pressure. For example, a larger number of stacks may be desired in order to increase the rigidity at the level of the zone of the bead.

The carcass-type reinforcement structure is preferably formed of a cord winding extending back and forth between the two beads, forming loops in each of the beads. Furthermore, the cord winding is preferably formed of a single cord.

DESCRIPTION OF THE DRAWINGS

Other characteristics and advantages of the invention will become apparent on reading the examples of embodiment of the tire according to the invention, which are given in non-limitative manner, with reference to the appended FIGS. 1 to 5, in which.

DESCRIPTION OF PREFERRED EMBODIMENTS

Figure 2:
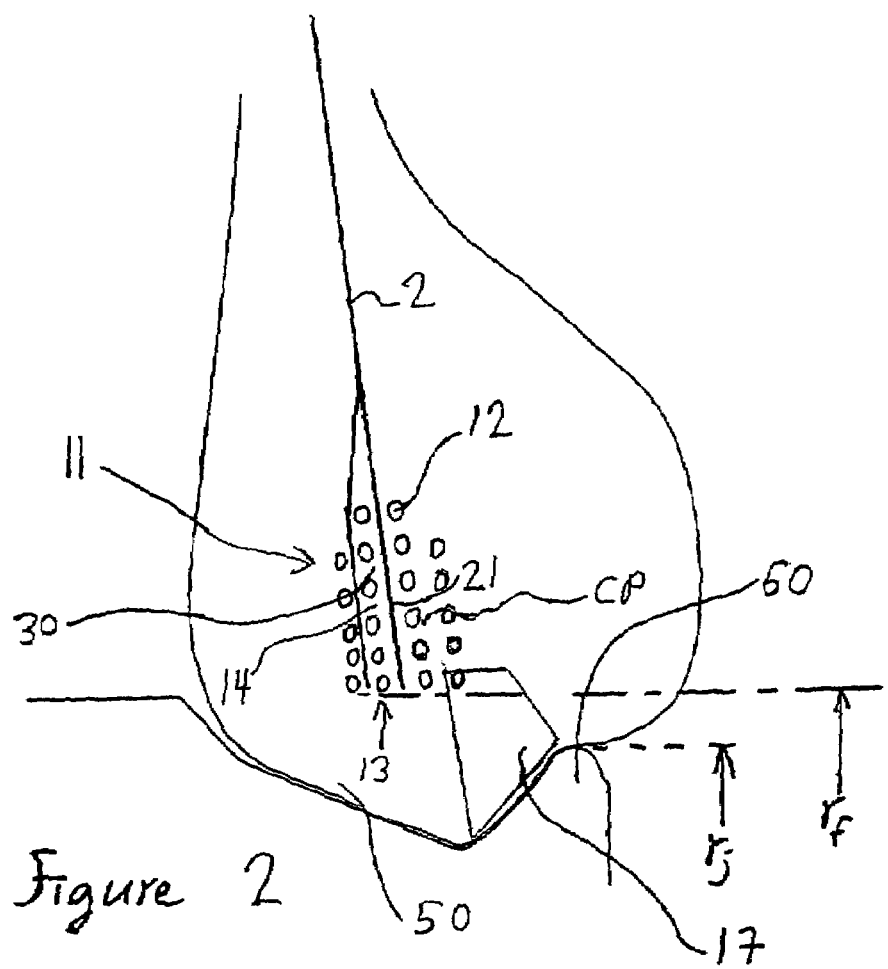
FIG. 2 shows, in an enlarged cross-section, a bead of a first variant of a tire according to the invention.

The reinforcement armature or reinforcement of the tires is currently—and most frequently—constituted by stacking one or more plies conventionally referred to as "carcass plies", "crown plies", etc. This manner of designating the reinforcement armatures comes from the manufacturing process, which consists of producing a series of semi-finished products in the form of plies, provided with cord reinforcing threads which are frequently longitudinal, which are subsequently assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, in order to obtain a product ready for vulcanisation.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, for this type of process, a portion of all the plies forming the carcass reinforcement (or of part only) is turned up around a bead wire arranged in the bead of the tire. In this manner, anchoring of the carcass reinforcement in the bead is effected.

The fact that this conventional type of process is becoming more widespread in the industry, despite numerous variants in the manner of producing the plies and assemblies, has led the person skilled in the art to use a vocabulary modelled on the process; hence the generally accepted terminology, comprising in particular the terms "plies", "carcass", "bead wire", "shaping" to designate the change from a flat profile to a toroidal profile, etc.

However, there are nowadays tires which do not, properly speaking, comprise "plies" or "bead wires" in accordance with the preceding definitions. For example, document EP 0 582 196 describes tires manufactured without the aid of semi-finished products in the form of plies. For example, the cords of the different reinforcement structures are applied directly to the adjacent layers of rubber mixes, the whole being applied in successive layers on a toroidal core having a shape which makes it possible to obtain directly a profile similar to the final profile of the tire being manufactured. Thus, in this case, there are no longer any "semi-finished products", nor "plies", nor "bead wires". The base products, such as the rubber mixes and reinforcing threads in the form of cords or filaments, are applied directly to the core. As this core is of toroidal form, the blank no longer has to be shaped in order to move from a flat profile to a profile in the form of a torus.

Furthermore, the tires described in this document do not have the "conventional" upturn of the carcass ply around a bead wire. This type of anchoring is replaced by an arrangement in which circumferential filaments are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising both certain semi-finished products to produce certain architectural aspects (such as plies, bead wires, etc), whereas others are produced from the direct application of mixes and/or reinforcing threads in the form of filaments.

In the present document, in order to take into account recent technological developments both in the field of manufacture and in the design of products, the conventional terms such as "plies", "bead wires", etc, are advantageously replaced by neutral terms or terms which are independent of the type of process used. Thus, the term "carcass-type reinforcing thread" or "sidewall reinforcing thread" is valid as a designation for the reinforcement cords of a carcass ply in the conventional process, and the corresponding cords, generally applied at the level of the sidewalls, of a tire produced in accordance with a process without semi-finished products. The term "anchoring zone", for its part, may equally well designate the "traditional" upturn of a carcass ply around a bead wire of a conventional process or the assembly formed by the circumferential filaments, the rubber mix and the adjacent sidewall reinforcement portions of a bottom zone produced with a process with application to a toroidal core.

In the present description, the term "cord" very generally designates both monofilaments and multifilaments or assemblies such as cables, plied yarns or alternatively any equivalent type of assembly, whatever the material and the treatment of these cords. They may, for example, be surface treatments, coating or pre-sizing in order to promote adhesion to the rubber. The expression "unitary cord" designates a cord formed of a single element, without assembly. The term "multifilaments" on the contrary designates an assembly of at least two unitary elements to form a cable, a plied yarn, etc.

On the other hand, "radial structure" is understood to mean an arrangement at 90 degrees, but also, in accordance with custom, at an angle close to 90°.

It is known that, conventionally, the carcass ply or plies is/are turned up about a bead wire. The bead wire then performs a carcass anchoring function. Thus, in particular, it withstands the tension which develops in the carcass cords for example under the action of the inflation pressure. The arrangement described in the present document makes it possible to provide a similar anchoring function. It is also known to use the bead wire of conventional type to provide a function of clamping the bead on a rim. The arrangement described in the present document also makes it possible to provide a similar clamping function.

In the present description, "bonding" rubber or mix is understood to mean the rubber mix possibly in contact with the reinforcement cords, adhering to the latter and capable of filling the interstices between adjacent cords.

"Contact" between a cord and a layer of bonding rubber is understood to mean the fact that at least part of the outer contour of the cord is in intimate contact with the rubber mix constituting the bonding rubber.

"Sidewalls" refers to the portions of the tire, most frequently of low flexural strength, located between the crown and the beads. "Sidewall mix" refers to the rubber mixes located axially to the outside relative to the cords of the reinforcement structure of the carcass and to their bonding rubber. These mixes usually have a low elasticity modulus.

"Bead" refers to the portion of the tire adjacent radially internally to the sidewall.

"Elasticity modulus" of a rubber mix is understood to mean a secant modulus of extension obtained at a uniaxial deformation of extension of the order of 10% at ambient temperature.

Figure 3:
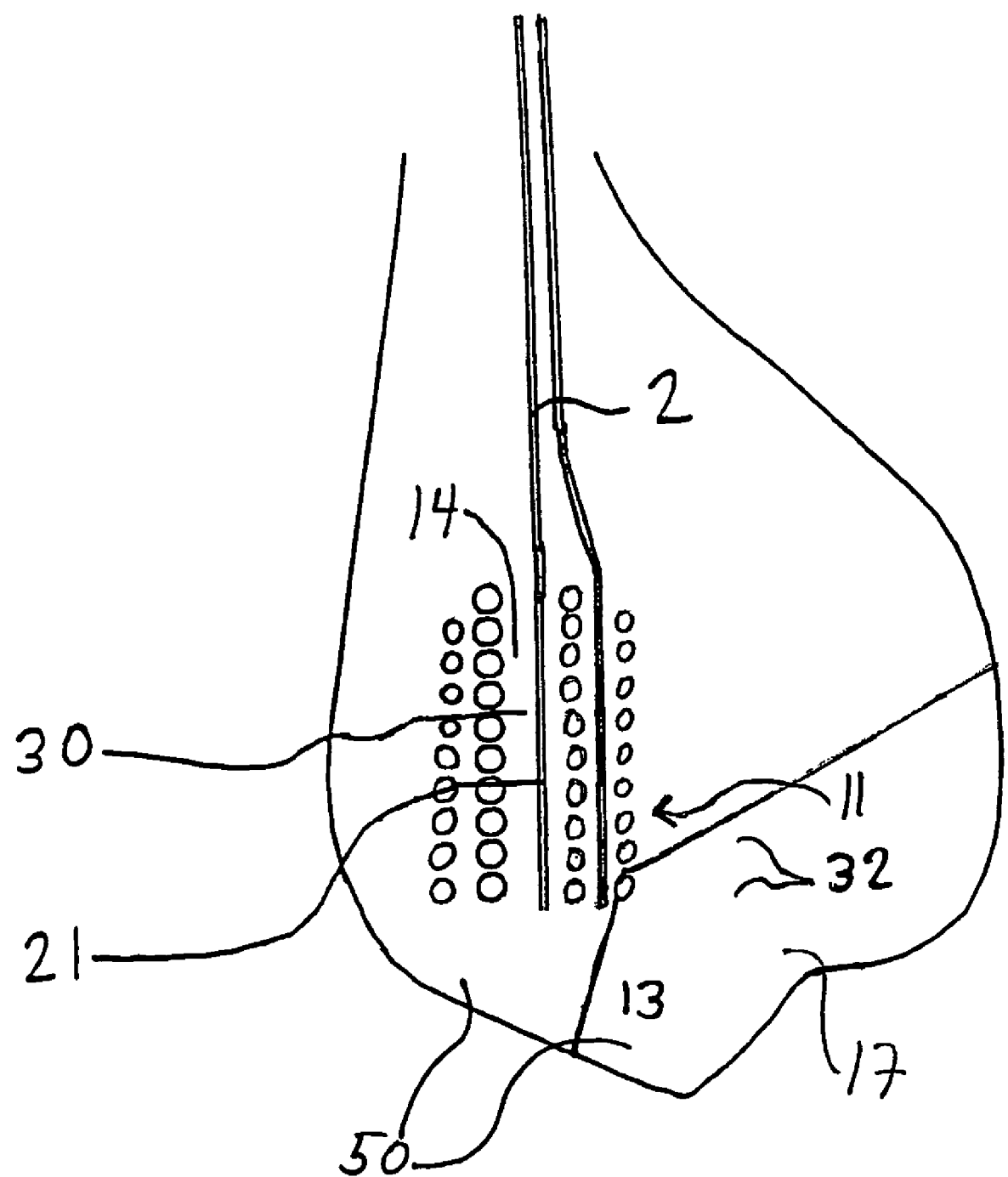
FIG. 3 shows, in an enlarged cross-section, a bead of a second variant of a tire according to the invention.

"Stack" is understood to mean a substantially radial superposition of cords or of turns of a single cord when the bead is viewed in section in the diametral plane as in FIG. 2 or 3.

Figure 1:
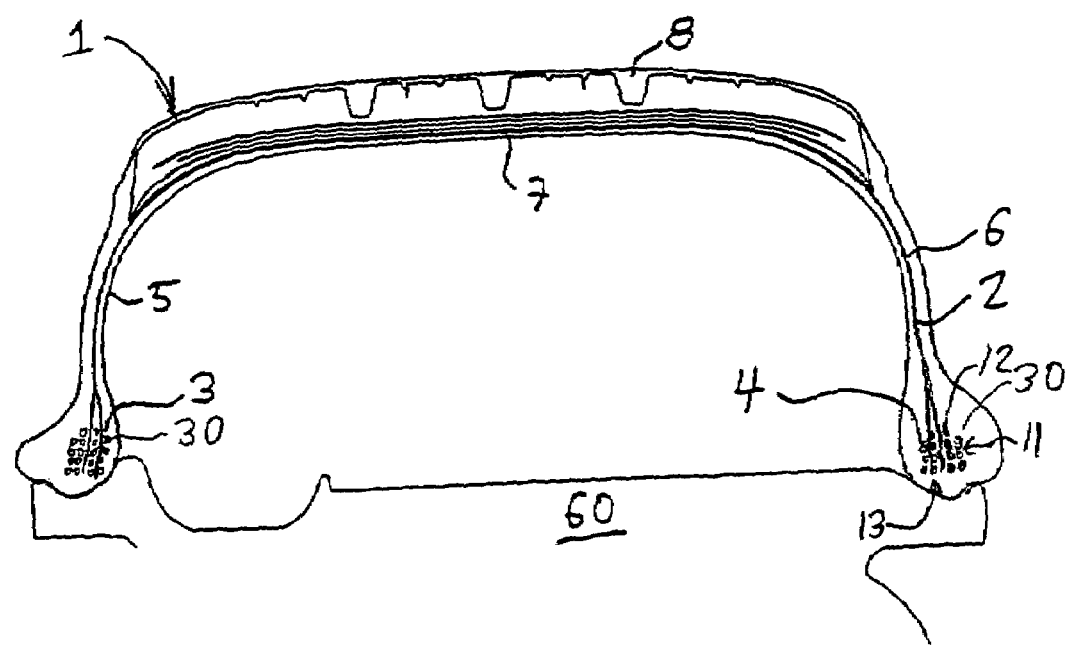
FIG. 1 shows, in cross-section, a tire according to the invention.

FIG. 1 shows, in cross-section, a tire 1 according to the invention. This tire comprises a first sidewall 5 adjacent to a first bead 3 which preferably corresponds to the inner bead. Similarly, the opposite portion of the tire comprises a second sidewall 6 adjacent to a second bead 4. A crown 7, on which there is provided a tread 8, forms the join between the sidewalls. The crown preferably comprises at least one reinforcement belt.

The tire comprises a carcass-type reinforcement structure 2, provided with reinforcing threads which are advantageously formed in a substantially radial arrangement. This structure may be arranged continuously from one bead to the other, passing via the sidewalls and the crown, or alternatively it may comprise two or more parts, arranged for example along the sidewalls, without covering the entire crown.

The end portions 21 of the reinforcement structure 2 are located in the beads.

The bead furthermore comprises a substantially circumferential anchoring zone 30 comprising an arrangement 11 of circumferential cords 12 arranged substantially adjacent to the end portion 21 of the reinforcement structure. A bonding (or anchoring) mix 14 is interposed between the circumferential cords 12 and the reinforcement structure 21.

The arrangements 11 of cords 12 may be arranged and manufactured in several ways. For example, a stack 13 may advantageously be formed of a single cord 12, wound (substantially at zero degrees) in a spiral, preferably from the smallest diameter towards the largest diameter. A stack may also be formed of a plurality of concentric cords laid one in another.

The reinforcement structure 2 can be formed by winding a single cord which extends back and forth between the two beads, forming loops in each of the beads. These loops, which are coated in the rubber mix, contribute to the mechanical bond between the reinforcement structure 2 and the bead, in particular the stacks 13. By the presence of loops between the "back" and "forth" sections of the cord, it can be seen that the reinforcement is of the monofilament type. Of course, it is possible for the reinforcement structure not to be produced in continuous manner from a single cord, and it is possible for there not to be any loops, but, for example, free ends.

Figure 4:
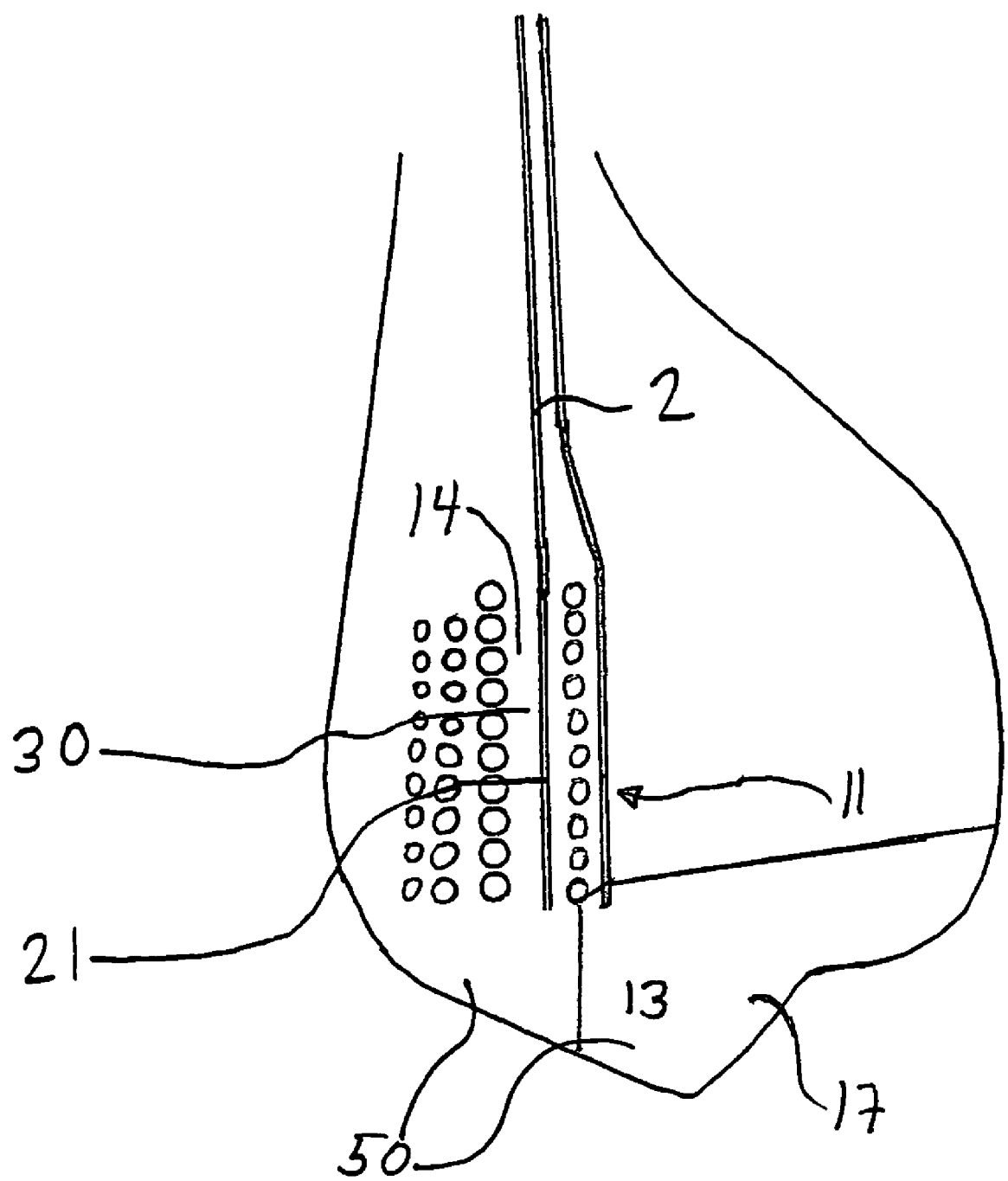
FIG. 4 shows, in an enlarged cross-section, a bead of another variant of a tire according to the invention.

FIGS. 2, 3 and 4 illustrate examples of beads the anchoring zones 30 of which are arranged in said bead such that, at normal pressure, the forces of the reinforcement structure are distributed substantially homogeneously on either side of said structure, within said anchoring zone.

This is a structure substantially insensitive to variations in pressure since upon inflation of the tire, between zero pressure values and a normal operating or service pressure (such as, for example, between 1.5 and 3 bar for a vehicle of passenger-vehicle type, and more particularly between 1.8 and 2.5 bar), the distribution of pressure along the bearing zone remains similar.

Such dynamic stability may advantageously be obtained by an optimised arrangement of the anchoring elements, in particular of the circumferential cords 12 which in these examples are distributed asymmetrically on either side of the reinforcement structure. On the other hand, the end portions 21 of the carcass-type reinforcement structure are shaped by an alternating arrangement of certain cords axially arranged towards the inside of the bead, and of other cords axially arranged towards the outside of the bead. This may be an alternation on the basis of only one, two, or even several cords, arranged once on one side, then on the other, in alternation, moving along the circumference of the tire.

The alternation may also be starting from several base configurations of the carcass-type reinforcement structure. First of all, as illustrated in FIGS. 1 and 2, the tire comprises a single carcass-type reinforcement structure: at the level of the bead, this is divided into two axially separated portions, comprising at least one stack 13 of circumferential cords 12 between the two portions.

In FIG. 3, the tire comprises two carcass-type reinforcement structures: at the level of the bead, the end portion of each of these structures forms a portion 21, one axially inner and the other axially outer, relative to one another.

Figure 5:
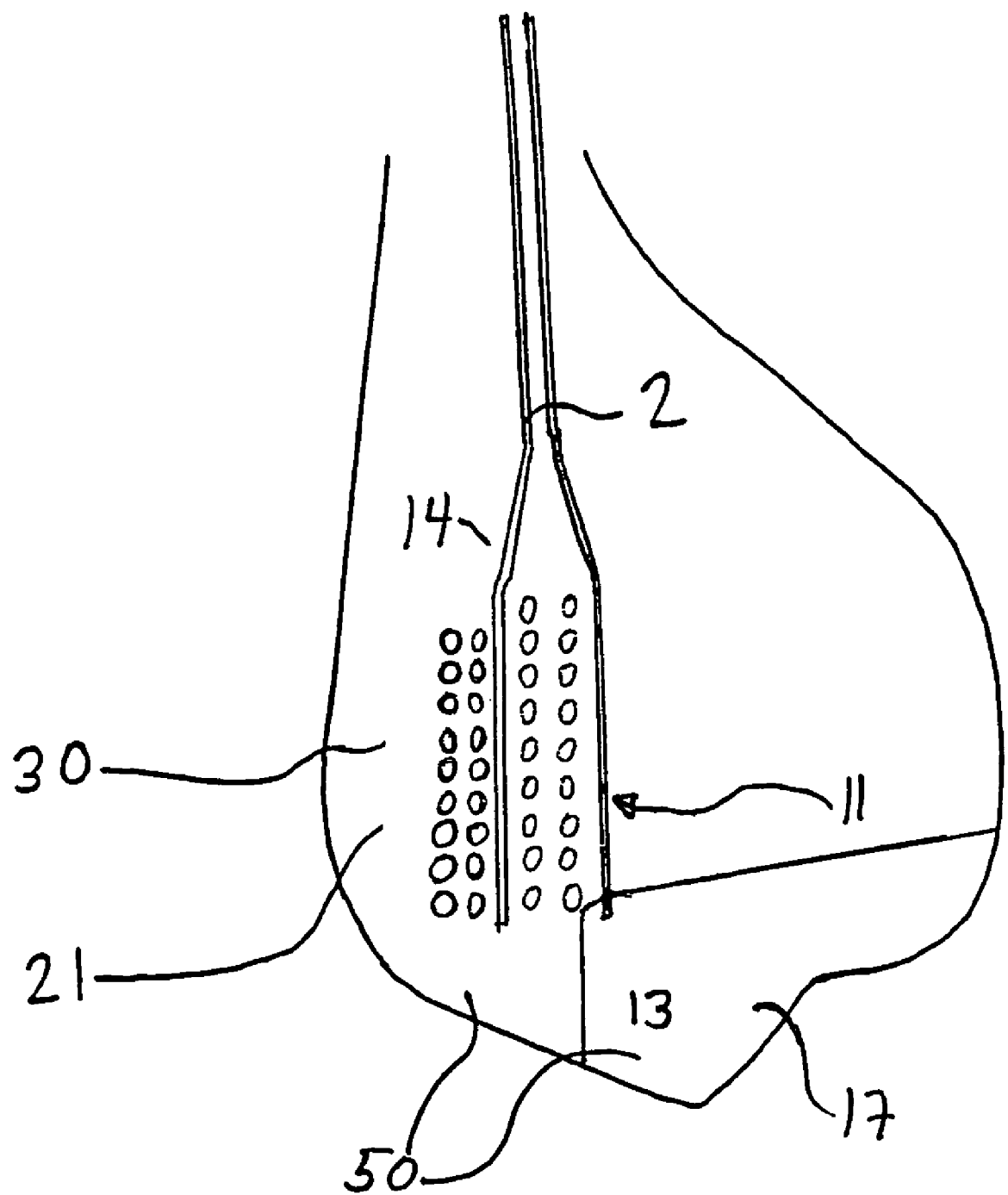
FIG. 5 shows, in an enlarged cross-section, a bead of another variant of a tire according to the invention.

FIGS. 3 to 5 illustrate variants in which the arrangement of the stacks varies. For example, in FIGS. 3 and 4, a single stack is arranged between the portions 21, whereas in FIG. 5 there are 2 stacks. In FIG. 3, there is an axially outer stack relative to the carcass-type reinforcement structure, whereas there is no stack in such a position in the examples of FIGS. 4 and 5.

It should be noted that the arrangements of the stacks of the examples of FIGS. 3 to 5 could be associated with an arrangement with a single carcass-type reinforcement structure. Similarly, the arrangement of FIG. 1 could be associated with a double carcass-type reinforcement structure. The number of axially inner stacks relative to carcass-type reinforcement structure may vary from one to three stacks or even more, as illustrated in the different examples. The same applies to the number of axially outer stacks relative to the carcass-type reinforcement structure. The total number of stacks is two or more, and preferably four. Their distribution beneficially takes account of the mechanical stresses of the tire and of the bead zone in particular, which it is desired to have distributed as homogeneously as possible.

The anchoring zone is advantageously provided in the immediate proximity of the centre of inertia CP of the bead.

In the examples of embodiment illustrated in FIGS. 2, 3, 4 and 5, the bead also comprises a bearing zone 50, arranged substantially between the anchoring zone and the seat of the bead, substantially aligned axially with these zones, said zone being suitable for subjecting to compression upon mounting of the tire on a suitable rim. This compression contributes to ensuring the clamping of the tire, by transmitting the clamping force produced by the clamping zone. The rubber mix of this zone is selected so as to provide good creep resistance, in order to ensure the durability of the clamping characteristics.

The portion of the bead between the part adjacent to the rim flange or hook 60 and the anchoring zone comprises an external lateral zone 17 or stop zone occupied or constituted preferably by a rubber mix of high modulus, for example of between 10 and 40 MPa.

This zone makes it possible to increase the clamping pressure, in particular in the region of the rim hook, by transmitting the forces of the anchoring zone towards said hook. Thanks to the limited deformability of the zone, it makes it possible to limit the tendency of the bead to slip radially outwards beyond the rim hook. It furthermore contributes, on the one hand, to the inhibition of any tendency to generate a rotational moment and, on the other, to establish dynamic stability, such as for example when cornering or on exposure to major lateral stresses.

Advantageously, the external lateral zone 17 is provided in the axially outer portion of the bead and extends between the portion adjacent to the rim hook and the anchoring zone. It comprises a portion adjacent to the anchoring zone, which permits a better mechanical action between said anchoring zone and the portion of the bead adjacent to the rim hook.

The tire according to the invention is particularly suitable for use on a rim of the type described in EP 0 673 324. Such a rim comprises a seat and preferably a raised area or flange located axially and radially towards the outside.

The bases of the stacks (the cords radially closest to the axis of rotation of the tire) are preferably arranged radially farther to the outside than the end of said flange (axially and radially outermost portion of said flange), as illustrated, for example, in FIG. 2. The bases of the stacks are advantageously provided so as to be arranged radially externally relative to the flange of the rim 60 (or rim hook) which is matched to the tire. The mounting/demounting operations are then facilitated. Thus, in FIG. 2, it will be seen that $r_f$ (radius of the first cords) is greater than $r_j$ (radius of the rim flange or hook). This radius corresponds to the distance from the axis of rotation.

The different examples of embodiment described and/or illustrated may advantageously be produced using devices of the types described in EP 0 580 055.

Thus, for example, it is very advantageous to build the tire on a central core which imposes the shape of its internal cavity. There are applied to this core, preferably in the order required by the final architecture, all the constituents of the tire, which are arranged directly in their final position, in a substantially final profile. In this case, such a tire can be moulded and vulcanised as set forth in U.S. Pat. No. 4,895,692.

What is claimed is:

1. A tire for a vehicle wheel, comprising:
   two sidewalls spaced apart axially from each other, joined at their radially outer portions by a crown zone provided on its radially outer portion with a circumferential tread;
   beads, arranged radially to the inside of each of the sidewalls, each bead comprising a seat and an outer flange which are intended to come into contact with a suitable rim;
   a reinforcement structure extending substantially radially from each of the beads, along the sidewalls, towards the crown zone;
   at least one of said beads comprising:
      a bead seat comprising a generatrix the axially inner end of which is located on a circle of diameter greater than the diameter of the circle on which the axially outer end thereof is located;
      an anchoring zone for the reinforcement structure in said bead, comprising an arrangement of circumferential first cords arranged substantially adjacent to a portion of the reinforcement structure and comprising at least two stacks distributed on either side of the reinforcement structure, a bonding mix being arranged between the circumferential cords and the reinforcement structure, said anchoring zone being arranged in said bead in such a manner that, at normal pressure, the forces of the reinforcement structure are distributed substantially homogeneously on either side of said reinforcement structure, in said anchoring zone, said reinforcement structure comprising second cords arranged so as to obtain a circumferential distribution of the second cords on opposite sides of at least one of said stacks;
      a bearing zone for said bead extending substantially along the seat of the latter;
      said tire also comprising an external lateral zone arranged in the zone of the bead provided to be arranged between the rim hook and the anchoring zone, said zone being filled by a rubber mix of substantially high modulus.

2. The tire of claim 1, in which the external lateral zone is provided in the axially outer portion of the bead and extends between the portion adjacent to the rim hook and the anchoring zone.

3. The tire of claim 1, in which the external lateral zone cooperates with the anchoring zone.

4. The tire of claim 1, wherein the reinforcement structure comprises a single carcass-type reinforcement structure the second cords of which are arranged circumferentially alternating, axially internally and axially externally relative to said at least one stack.

5. The tire of claim 1, wherein reinforcement structure comprises two carcass-type reinforcement structures the second cords of one of the reinforcement structures being arranged axially internally, and the second cords of the other reinforcement structure being arranged axially externally relative to said at least one stack.

6. The tire of claim 1, wherein the reinforcement structure comprises a carcass-type reinforcement structure, and in which several stacks of circumferential first cords are arranged between the axially inner and axially outer portions of the carcass-type reinforcement structure.

7. The tire of claim 1, in which, between values corresponding substantially to a zero pressure and a normal operating pressure, the distribution of pressure along the bearing zone is substantially independent of said pressure value.

8. The tire of claim 1, in which said forces cause a clamping pressure of the bead which is substantially symmetrical, or slightly asymmetrical on either side of the reinforcement structure.

9. The tire of claim 1, in which the anchoring zone is in the immediate proximity of the centre of inertia of the bead.

* * * * *